Figure 1:
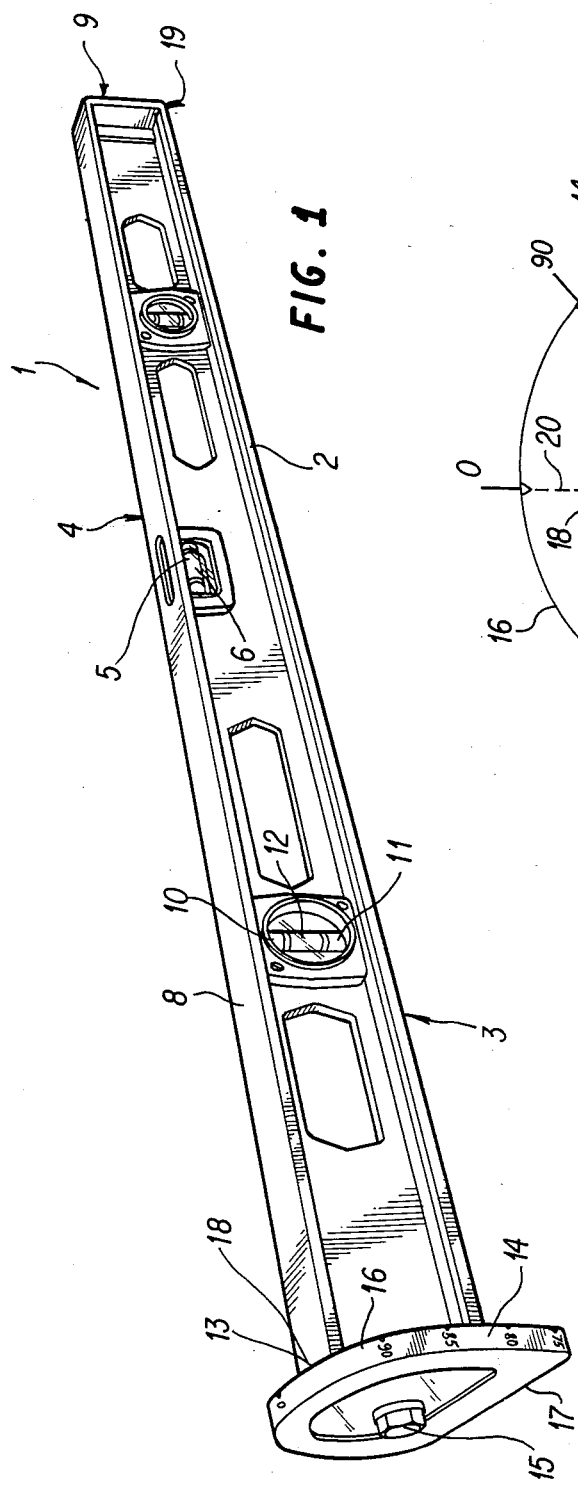

United States Patent [19]

Boundy

[11] Patent Number: 4,543,731
[45] Date of Patent: Oct. 1, 1985

[54] GRADIENT MEASURING DEVICES

[76] Inventor: Geoffrey A. Boundy, Heaslip Rd., Angle Vale, South Australia 5117, Australia

[21] Appl. No.: 359,523

[22] Filed: Mar. 18, 1982

[30] Foreign Application Priority Data

Mar. 18, 1981 [AU] Australia .............................. PE8050

[51] Int. Cl.⁴ ............................................ G01C 91/00
[52] U.S. Cl. .................................................. 33/375
[58] Field of Search ................. 33/374, 375, 343, 144, 33/451, 174 S, 338

[56] References Cited

U.S. PATENT DOCUMENTS

| | | | |
|---|---|---|---|
| 1,701,069 | 2/1929 | Frantz | 33/375 |
| 2,155,391 | 4/1939 | Arden | 33/247 |
| 2,743,528 | 5/1956 | Posthauer | 33/375 |
| 2,846,772 | 8/1958 | Strausser | 33/168 R X |

Primary Examiner—Harry N. Haroian
Attorney, Agent, or Firm—Armstrong, Nikaido, Marmelstein & Kubovcik

[57] ABSTRACT

A gradient measuring device incorporating a conventional level such as a spirit level and having an end gauge member which is rotatable providing a lowermost reference by which when the level is horizontal there is a gauge reference to a slope position between the lowermost point on the gauge and the further lowermost end of the level.

5 Claims, 2 Drawing Figures

U.S. Patent  Oct. 1, 1985  4,543,731

GRADIENT MEASURING DEVICES

This invention relates to means for the measuring of gradients.

The problem to which this invention is directed relates not to the difficulty as such of measuring a gradient but rather of providing equipment for measuring a gradient which can be economically manufactured, and in use able to withstand the most difficult environmental conditions and able in a very convenient way and with reasonable accuracy the actual slope or gradient of a particular member.

The invention accordingly can be said to reside in a gradient measuring device including an elongate member having a lowermost planar face, horizontally determining means secured to the elongate member and adapted to indicate thereby the horizontally or otherwise of the planar face, and, at one end of the elongate member, a gauge member rotatably secured to the elongate member and adapted to include a portion adapted to extend when the gauge is in any one of a plurality of selected positions relative to the elongate member lower than the otherwise lowermost planar face, and reference markings on the gauge member arranged to indicate a measure of the gradient existing between the said portion of the gauge member and a lowermost portion of the elongate member at its end furthermost from the gauge member, when the planar face is horizontal.

Preferably the means for determining the horizontality of the lowermost planar face include a bubble within fluid within a curved tube secured to the elongate member and adapted to indicate by reason of the position of the bubble with respect to the curved tube and thereby the elongate member the horizontally or otherwise of the planar face.

The manufacture of devices conventionally known as "spirit levels" is very well known and quite common to the art.

Such devices which are mass produced are adapted by reason of their now extensive development and design to perform the task of indicating a horizontal or in many instances a vertical level is well known.

Furthermore, these devices are now able to be purchased at an economic price and will indicate within acceptable limits of accuracy actual horizontality or verticality of a particular face.

These devices however do not indicate gradient.

The feature of the invention is that a spirit level of the well known type can be very simply modified so that all the advantages of a well known mass produced article are available and the additions which can be made also very economically adds little to the existing cost so that for a very slight additional cost, the well known device can be broadly extended in application.

A feature of the invention is that the device that is added is attached by a pivotal connection so that firstly the means by which the device is connected to a conventional spirit level can be effectively sealed from dust or wet cement or water and such protection can be very economically achieved and furthermore, by providing that the gauge member is rotatable can mean that the gauge member can be rotated to an extent that brings the planar face to horizontality while actually resting on a measurable face and the reading of slope can then be directly determined.

It has been found that the aspect of making the gauge member rotatable has shown very significant improvement in the value of the device both in terms of its practicality and ability to resist degradation from the elements and also from the very important point with respect to ease for operation.

Preferably the gauge member is rotatably supported about an axis parallel to the planar face and aligned in the direction of elongation of the elongate member and has an outermost circumference providing an arcuately curved shape providing different distances from the axial centre such that such outermost circumference provides the lowermost portion.

A preferable feature is that at least in one position of the gauge member relative to the elongate member the lowermost portion of the gauge member coincides with the plane defined by the lowermost planar face of the elongate member.

This last feature means that by locating the gauge member in such a position, the elongate member can be used as a conventional spirit level indicating conventional horizontality or otherwise of the face to be measured so the spirit level is functioning as a conventional spirit level in this instance.

Figure 2:
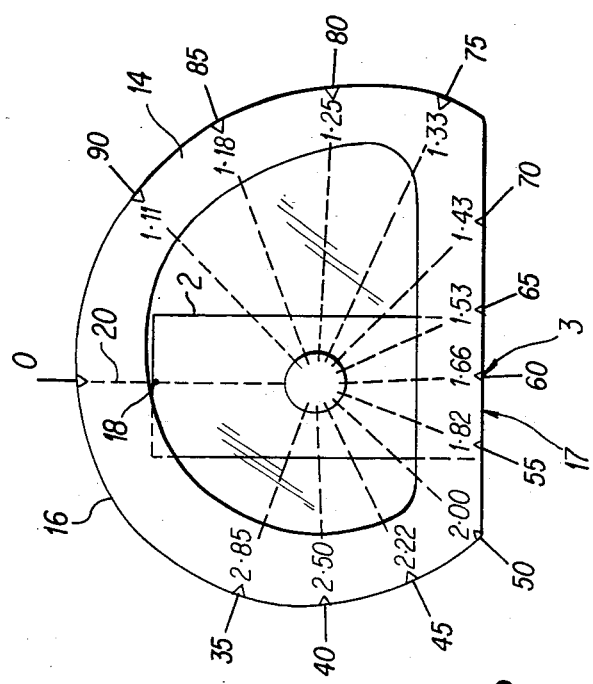

For better understanding of this invention it will now be described with reference to a preferred embodiment with the assistance of drawings in which:

FIG. 1 is a perspective view of a spirit level modified according to this preferred embodiment and FIG. 2 is an end view of the embodiment as shown in FIG. 1.

Referring to the drawings the gradient measuring device 1 includes an elongate member 2 having a lowermost planar face 3 and horizontality determining means 4 which comprise a bubble 5 within a spirit fluid 6 held within a curved tube 7 which is fixed in position relative to the elongate member 2.

The elongate member 2 is in the form of a conventional spirit level and accordingly has other faces which are parallel to the first stated lowermost planar face 3 these including an uppermost planar face 8 and an end planar face 9 perpendicular to the faces 3 and 8.

There are means to indicate the verticality of the respective faces 3 and 8 these being shown at 10 and including a bubble within a spirit fluid 11 which is held within a curved tube 12.

At the end of the elongate member 2 furthermost from the stated end 9 is a further end 13 to which there is attached a gauge member 14.

The gauge member 14 is secured to the elongate member 2 by means of bolt 15 which passes through an aperture in the gauge member 14 and which is held by passing through a portion of the elongate member 2 and having at its end a nut which is sufficiently tightened so as to allow the gauge member 14 to rotate about the bolt 15 but this being held with sufficient tightness so that the gauge member 14 while being able to be freely moved nonetheless will retain with positive location any relative axial position to which it is located.

The axial alignment of bolt 15 and therefore the axial centre of rotation of the gauge member 14 is such that the axis is in the direction of elongation of elongate member 2 and this is parallel to the planar lowermost face 3.

The outer shape of the gauge member 14 at the circumference 16 is curved and carefully arranged so that at its lowermost position 17 when this is either coincident with or lower than the lowermost face 3 then the gauge already shown in illustrative manner around the circumference in drawing FIG. 2 will indicate when coinciding with notch 18 in the upper end location of the elongate member 2 a measure of the slope which exists when the said lowermost portion 17 and the lowermost portion at the further end at 19 are each located on the respective portions of a member the gradient of which is to be determined.

As shown in FIG. 2, the position of the gauge member 14 is such that a lowermost portion 17 is coincident with the lowermost face 3 that is its lowermost face coincides with a plane defined by the lowermost face 3 and it will be seen that there is a zero indication with respect to gauge line 20 where this coincides with notch location 18.

In this condition, the elongate member 2 can be used as a conventional level and will not in any sense alter the working of this device.

When however a gradient is to be measured, the gauge member 14 can be rotated so as to have appropriate coincidence of the gauge line corresponding to the required gradient and the respective lowermost portions can be located on the required member and reference to the location of bubble 5 with respect to gauge lines on the curved tube 7 will then indicate whether the required gradient does exist or whether the gradient is higher or lower than that required.

A significant feature of this invention is that the gauge member 14 can be very easily rotated while both its gauge position is viewable and the position of the bubble 5 relative to the markings is visible.

This means that if a slope of one part in 70 is required and first set on the device, then when the device is located on the member the gradient of which is to be measured, if the bubble 5 does not show that the lowermost base 3 is horizontal, then it is a simple matter of altering the position of the gauge member 14 relative to the elongate member 2 and reading the actual gradient involved.

A very significant advantage of the arrangement shown is that apart from the spirit level which is conventionally manufactured and well designed by mass production techniques, there is simply the addition of one member being the gauge member together with a bolt and appropriate tightening means by which the relatively moving faces can be fairly economically sealed against egress of water or dust or cement and even quite deleterious conditions can exist without the device losing substantial accuracy.

A further feature is that the corrections to the slope can be made while a single person is viewing both the level of the bubble reference and the gauge position from the gauge member.

It is of course clearly understood that the illustration shown in the drawings and being the preferred embodiment shows markings around the gauge member which are illustrative of the type of markings that would be used in practice.

The actual distance of the outer circumference from the axial centre in each case to effect the referred to slope is a factor related both to the position of the axial centre with respect to the lowermost planar face 3 and particularly the length of the elongate member 2 from the location 19 to the position of the underneath or lowermost face of the gauge member 14.

Accordingly the reference marks can only be accessed as illustrative these being given in one instance that is external to the gauge member as one part with respect to the numbers of parts given typically one part in 90 as the slope or one part in 85 or one part in 80 and so on.

The figures actually shown on the gauge member show the same slope figure expressed as 100 divided by X where X is the figure given outside of the gauge member.

Accordingly from this description now it will be appreciated that what is shown is an eminently practical device which can be economically manufactured and which can be extremely useful for applications such as those requiring a robust instrument with reasonable degrees of accuracy and easy ability to use and measure slopes or gradients. Applications for plumbers, cement finishers and so on are typical of these applications.

I claim:

1. A gradient measuring device including an elongate member having a lowermost planar face, horizontally determining means secured to the elongate member and adapted to indicate thereby the horizontality or otherwise of the planar face, a gauge member rotatably secured to one end of the elongate member for rotation about an axis extending in the direction of elongation of said elongate member and parallel to said planar face, said gauge member including a portion adapted to extend when the gauge is in any one of a plurality of selected positions relative to the elongate member lower than the otherwise lowermost planar face, and reference markings on the periphery of the gauge member referable with respect to the elongate member and arranged to indicate a measure of the gradient existing between the said portion of the gauge member and a lowermost portion of the elongate member at its end furthermost from the gauge member, when the planar face is horizontal.

2. A gradient measuring device as in the claim 1 wherein the horizontality determining means include a bubble within fluid within a curved tube secured to the elongate member and adapted to indicate by reason of the position of the bubble with respect to the curved tube and thereby the elongate member the horizontality or otherwise of the planar face.

3. A gradient measuring device as in either of claims 1 or 2 in which the gauge member is further characterised in that at least in one position it has its lowermost portion co-planar with the lowermost planar face of the elongate member.

4. A gradient measuring device including an elongate member having a lowermost planar face, horizontality determining means including a bubble with fluid within a curved tube secured to the elongate member and adapted to indicate by reason of the position of the bubble with respect to the curved tube and thereby the elongate member the horizontality or otherwise of the planar face, and a gauge member rotatably secured to one end of the elongate member for rotation about an axis extending in the direction of elongation of the elongate member and parallel to said planar face, said gauge member including a portion adapted to extend when the gauge is in any one of a plurality of selected positions relative to the elongate member lower than the otherwise lowermost planar face, and reference markings on the gauge member arranged to indicate relative to the elongate member a measure of the gradient existing between the said portion of the gauge member and a lowermost portion of the elongate member at its end furthermost from the gauge member, when the planar face is horizontal.

5. A gradient measuring device as in claim 4 wherein the gauge member comprises an outermost circumference having an arcuate shape providing differing distances upon rotation relative to the elongate member from the rotatable axial centre to provide differing distances of a lowermost portion relative to the axial centre and thereby the elongate member.

* * * * *